J. B. VOGELSANG.
DEVICE FOR COMBINING AND EMULSIFYING SUBSTANCES.
APPLICATION FILED JUNE 8, 1914.
1,140,548. Patented May 25, 1915.
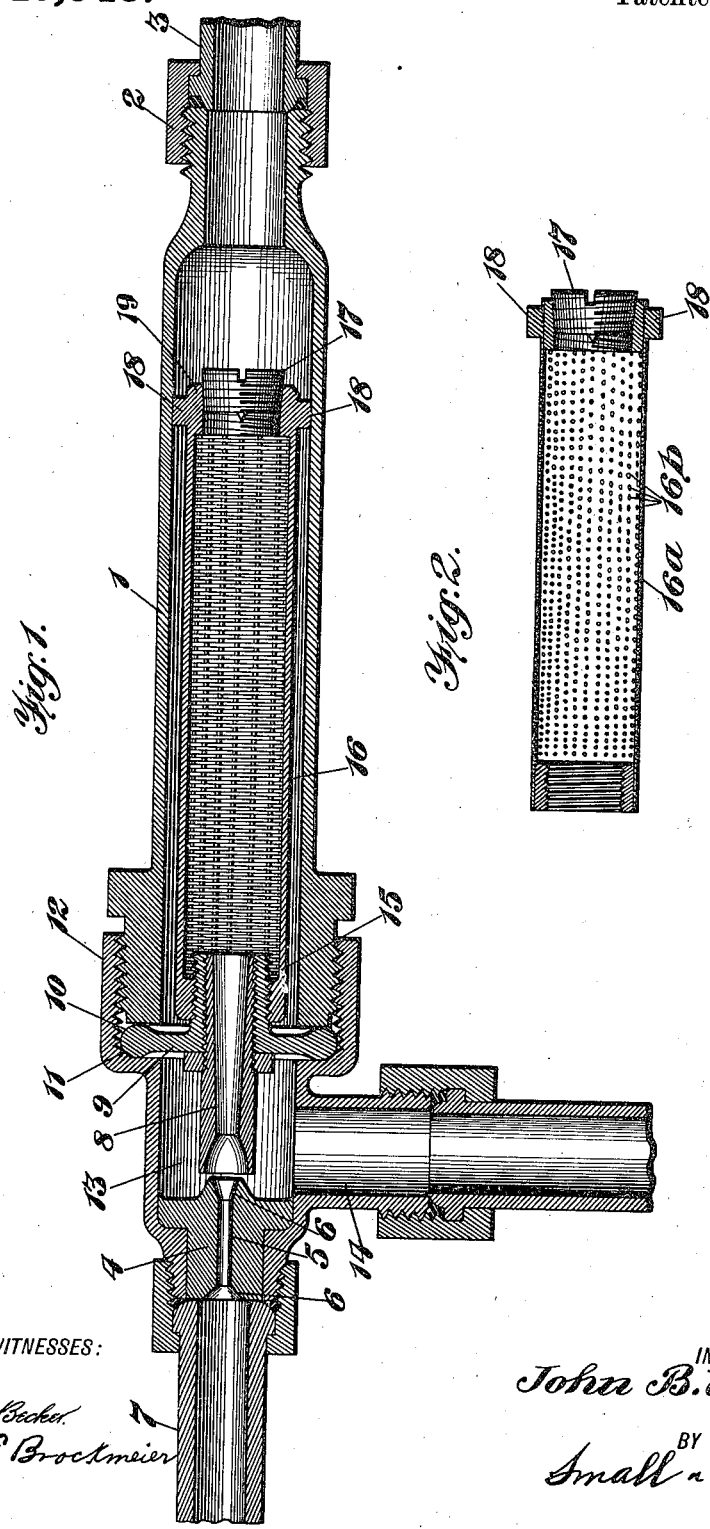
WITNESSES:
INVENTOR
John B. Vogelsang
BY
Small & Small
ATTORNEYS.

UNITED STATES PATENT OFFICE.

JOHN B. VOGELSANG, OF WEBSTER GROVES, MISSOURI.

DEVICE FOR COMBINING AND EMULSIFYING SUBSTANCES.

1,140,548.

Specification of Letters Patent.   Patented May 25, 1915.

Application filed June 8, 1914.   Serial No. 843,668.

*To all whom it may concern:*

Be it known that I, JOHN B. VOGELSANG, a citizen of the United States of America, residing at Webster Groves, in the county of St. Louis, State of Missouri, have invented certain new and useful Improvements in Devices for Combining and Emulsifying Substances, of which the following is a specification.

This invention relates primarily (but not exclusively) to devices for producing cream by the intimate admixture of skimmed milk by the intimate admixture of skimmed milk or milk powder with butter fat or an oil of suitable character; the object of the invention being to afford a simple, inexpensive, reliable and sanitary device for the purpose described.

In the accompanying drawing, wherein like numerals refer to like parts throughout the several views, Figure 1 is a longitudinal sectional view depicting the inferior arrangement of the device and Fig. 2 is a detail sectional view depicting a modification of one of the parts shown in Fig. 1.

Referring to the drawing, numeral 1 denotes the body of a sectional tube one end of which is coupled as at 2 to a pipe 3 leading to a cooling vat (not shown) and whose opposite extremity is substantially closed by a plug 4 through which is projected an aperture 5 having flaring ends 6 constituting a nozzle.

One of the extremities of said nozzle communicates directly with a pipe 7 through which air or steam is supplied under pressure and disposed adjacent the opposite end of the nozzle is a tube 8 which is supported by an annular member 9 having a rounded edge as at 10 for which a seat is provided as at 11 in the coupling 12. It will be noted that a portion of tube 8 projects within a chamber 13 and that a suction-pipe 14, whose lower end (not shown) is submerged in the mixture to be emulsified, communicates directly with said chamber. Detachably secured as at 15 upon the inner end of tube 8 is an emulsifying chamber 16, the same being preferably formed of fine woven wire and closed at one end by a removable screw-plug 17. By way of modification I may employ the finely perforated chamber 16ª shown in Fig. 2 in lieu of the wire-mesh chamber of Fig. 1 and in either case the free extremity of the emulsifying chamber is supported against the inner surface of tube 1 by means of lugs 18 formed integral with the metal band 19 in which plug 17 is seated.

In the arrangement of the elements of this device especial attention has been given to the production of an article all of whose parts can be readily separated and thoroughly cleansed and to this end it will be appreciated that coupling 12 permits of the easy detachment of the sections of tube 1 and that tube 8, member 9 and the emulsifying chamber are readily separable one from another so that all the parts where foreign substances might in time find lodgment may be kept in a thoroughly sanitary condition.

The operation of the device may be described as follows:—The extremity of pipe 14 being submerged in the vessel containing the mixture which it is desired to emulsify and the said mixture having been agitated and heated, steam or hot air under high pressure is then turned into pipe 7 and on passing through nozzle 5 serves to draw said mixture into chamber 13 whence it is forced through tube 8 into chamber 16. On reaching the emulsifying chamber the mixture is first projected against its closed end and the impact is such as to disrupt the fat globules and force the mixture backward against the inner surface of said chamber in the direction of tube 8, whereby a churning effect is produced which serves (especially when the woven wire chamber is used which presents a rough surface) to further disrupt the fat globules while thoroughly mixing the substances employed. The mixture having undergone this treatment, it is next forced through the wire-mesh of which the preferred emulsifying chamber is formed, or, if the modification be employed, through the apertures 16ᵇ shown in Fig. 2, this resulting in finely dividing the fat globules and so thoroughly commingling the substances as to produce cream which compares most favorably with the natural article.

What I claim as new and desire to secure by Letters-Patent is:—

1. A device of the character described comprising a tube, a pressure-fluid supply-pipe connected therewith, a nozzle disposed between said tube and pipe, a chamber adjacent said nozzle, a pipe extending from said chamber adapted to convey thereto the substances to be emulsified, and a perforate cylinder disposed within said tube.

2. A device of the character described comprising a tube, a pressure-fluid supply-pipe connected therewith, a nozzle disposed between said tube and pipe, a chamber adjacent said nozzle, a pipe extending from said chamber adapted to convey thereto the substances to be emulsified, and a perforate cylinder disposed within said tube having a roughened interior surface.

3. A device of the character described comprising a tube, a pressure-fluid supply-pipe connected therewith, a nozzle disposed between said tube and pipe, a chamber adjacent said nozzle, a pipe extending from said chamber adapted to convey thereto the substances to be emulsified, a perforate cylinder disposed within said tube, and a stopper removably secured at one extremity of said cylinder.

4. A device of the character described comprising a tube, a pressure-fluid supply-pipe connected therewith, a nozzle disposed between said tube and pipe, a chamber adjacent said nozzle, a pipe extending from said chamber adapted to convey thereto the substances to be emulsified, a perforate cylinder disposed within said tube, and means for preventing the displacement of said cylinder.

JOHN B. VOGELSANG.

Witnesses:
W. KEANE SMALL,
ANNA E. BROCKMEIER.